United States Patent
Barish

(10) Patent No.: US 11,430,129 B2
(45) Date of Patent: Aug. 30, 2022

(54) METHODS FOR UNIT LOAD DEVICE (ULD) LOCALIZATION

(71) Applicant: ZEBRA TECHNOLOGIES CORPORATION, Lincolnshire, IL (US)

(72) Inventor: Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/773,506

(22) Filed: Jan. 27, 2020

(65) Prior Publication Data

US 2021/0233249 A1    Jul. 29, 2021

(51) Int. Cl.
*G06K 9/00* (2022.01)
*G06T 7/13* (2017.01)
*G06Q 10/08* (2012.01)

(52) U.S. Cl.
CPC ........... *G06T 7/13* (2017.01); *G06Q 10/0838* (2013.01); *G06T 2207/10012* (2013.01); *G06T 2207/10024* (2013.01); *G06T 2207/10028* (2013.01); *G06T 2207/20081* (2013.01)

(58) Field of Classification Search
CPC ............. G06T 7/13; G06T 2207/10012; G06T 2207/10024; G06T 2207/10028; G06T 2207/20081; G06Q 10/0838
USPC .......................................................... 382/155
See application file for complete search history.

(56) References Cited

U.S. PATENT DOCUMENTS

| 10,762,331 | B1* | 9/2020 | Zhang | G06K 9/627 |
| 10,820,307 | B2* | 10/2020 | Zhang | H04W 72/14 |
| 10,991,116 | B1* | 4/2021 | Barish | G06V 20/64 |
| 11,010,915 | B2* | 5/2021 | Wang | G06T 7/70 |
| 11,017,346 | B2* | 5/2021 | Burch, V | H04W 4/12 |
| 2007/0127774 | A1* | 6/2007 | Zhang | G06K 9/00771 382/103 |
| 2008/0025565 | A1* | 1/2008 | Zhang | G06K 9/3241 382/103 |
| 2017/0293800 | A1 | 10/2017 | Babenko et al. | |
| 2019/0034734 | A1* | 1/2019 | Yen | G06T 7/246 |
| 2019/0352110 | A1* | 11/2019 | Yuvaraj | B25J 9/1697 |

FOREIGN PATENT DOCUMENTS

WO    2007122221 A1    11/2007

OTHER PUBLICATIONS

International Search Report and Written Opinion for International Application No. PCT/US2021/14910 dated Apr. 6, 2021.

* cited by examiner

*Primary Examiner* — Jonathan S Lee
(74) *Attorney, Agent, or Firm* — Yuri Astvatsaturov

(57) ABSTRACT

Methods for unit loading device (ULD) localization are disclosed herein. An example method includes capturing a set of image data featuring the ULD. The example method further includes cropping the set of image data to generate a cropped image. The cropped image features a portion of the ULD. The example method further includes determining one or more candidate edges of the portion of the ULD within the cropped image. The example method further includes identifying one or more edges of the portion of the ULD from the one or more candidate edges, wherein each of the one or more edges represents a boundary of the portion of the ULD.

18 Claims, 5 Drawing Sheets

METHODS FOR UNIT LOAD DEVICE (ULD) LOCALIZATION

BACKGROUND

In commercial shipping via airplanes, packages are loaded into containers called ULDs (unit load devices). Many different types of ULDs exist, of which about 20 are commonly used. This poses challenges for high-fidelity container analytics, because any algorithm must be generic enough to work with any ULD, but specific enough to provide accurate metrics for each specific container. Notably, prior to obtaining or performing most analytics, the analytics system must localize the ULD at the load point by identifying the position of the ULD within the system's field of view (FOV). Localization is critical to not only properly calculate loading metrics, but to also properly calibrate the system to the load point. Correspondingly, a major point of emphasis in the transportation/shipping industry is performing high fidelity localization at the load point of such containers.

Localizing the ULD at the load point is a substantial challenge for traditional systems, as the sides of the ULD can be straight, angled, and/or curved, as well as thick or thin. The localization process for traditional systems is further frustrated because many ULDs feature shiny, reflective metal surfaces. Consequently, the floor, back, and side panels of these ULDs do not appear in standard 3D images generated from Time of Flight (ToF) cameras in traditional systems. Accordingly, various problems generally arise regarding how to properly localize ULDs automatically, efficiently, and accurately at the loading point of the ULD.

Thus, there is a need for imaging systems and methods for ULD localization that allow for fast, efficient, and accurate real-time localization assessments for ULD load point analytics.

SUMMARY

In an embodiment, the present invention is a method for localizing a unit load device (ULD). The method includes capturing a set of image data featuring the ULD; cropping the set of image data to generate a cropped image, the cropped image featuring a portion of the ULD; determining one or more candidate edges (also referenced herein as "boundaries") of the portion of the ULD within the cropped image; and identifying one or more edges of the portion of the ULD from the one or more candidate edges, wherein each of the one or more edges represents a boundary of the portion of the ULD.

In a variation of this embodiment, the set of image data featuring the ULD comprises (i) a three-dimensional depth image and (ii) a grayscale image that is depth-aligned with the three-dimensional depth image. Moreover, in another variation of this embodiment, the set of image data is cropped based on an expected location of the ULD, wherein the expected location includes (i) an expected height of the ULD or (ii) an expected width of the ULD; and the method further includes performing (i) a height-based cropping, (ii) a width-based cropping, or (iii) a depth-based cropping to crop the set of image data to generate the cropped image.

In yet another variation of this embodiment, the set of image data is a first set of image data, and the method further includes (a) capturing a second set of image data featuring the ULD a duration D after capturing the first set of image data; (b) designating the second set of image data as a current set of image data; (c) cropping the current set of image data to generate a current cropped image, the current cropped image featuring a current portion of the ULD; (d) determining one or more current candidate edges of the current portion of the ULD within the current cropped image; (e) identifying one or more current edges of the current portion of the ULD from the one or more current candidate edges, wherein each of the one or more current edges represents a current boundary of the current portion of the ULD; (e) designating the current set of image data as a prior set of image data; (f) capturing a subsequent set of image data featuring the ULD the duration D after capturing the prior set of image data; (g) designating the subsequent set of image data as the current set of image data; and (h) iteratively performing steps (c)-(h) until the current set of image data does not feature the ULD.

In another embodiment, the present invention is a system for localizing a unit load device (ULD). The system includes a housing, an imaging assembly, one or more processors, and a non-transitory computer-readable memory. The imaging assembly is at least partially within the housing and configured to capture a set of image data featuring the ULD. The non-transitory computer-readable memory is coupled to the imaging assembly and the one or more processors. The memory stores instructions thereon that, when executed by the one or more processors, cause the one or more processors to: crop the set of image data to generate a cropped image, the cropped image featuring a portion of the ULD; determine one or more candidate edges of the portion of the ULD within the cropped image; and identify one or more edges of the portion of the ULD from the one or more candidate edges, wherein each of the one or more edges represents a boundary of the portion of the ULD.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
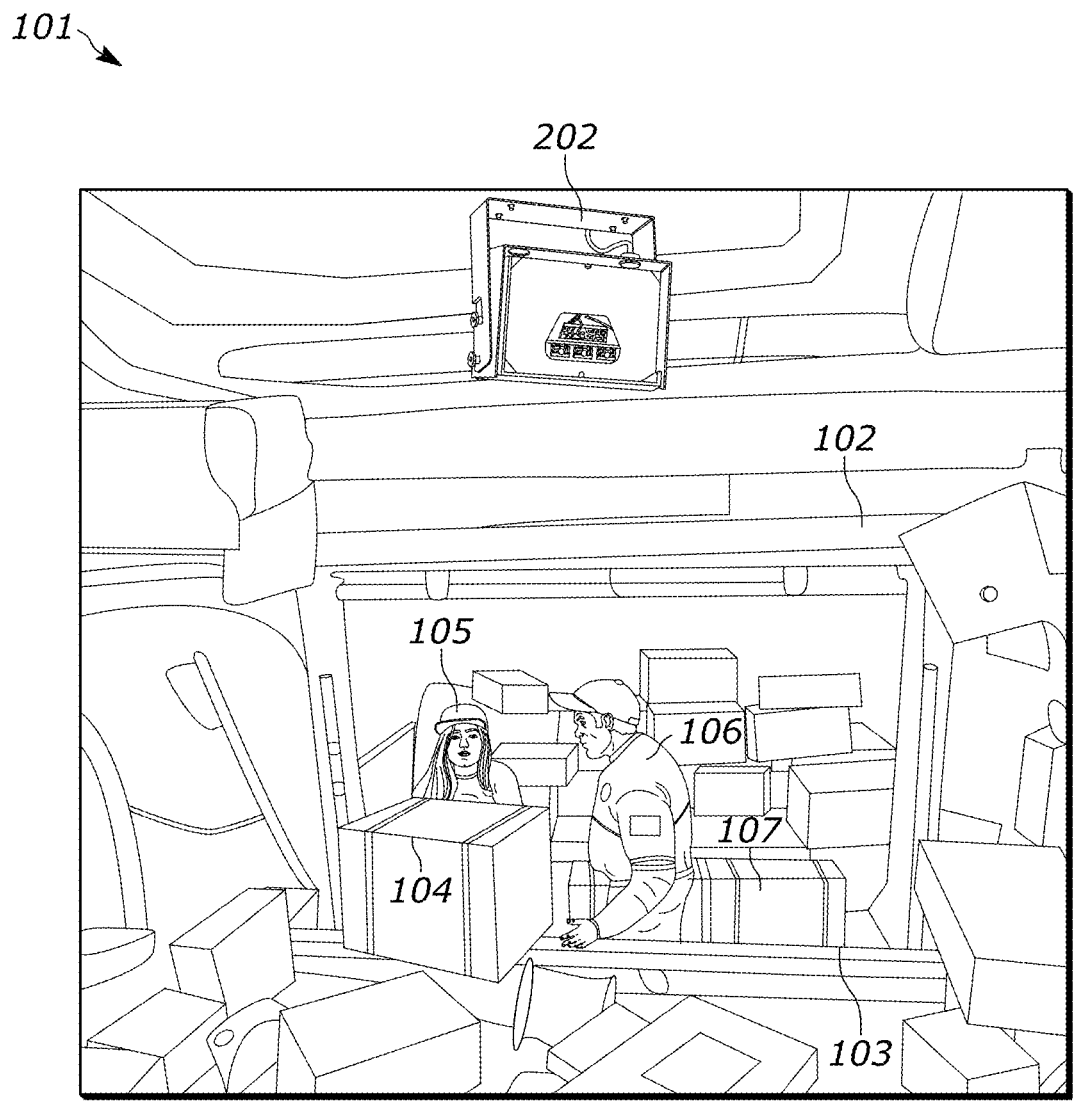
FIG. 1 is a perspective view, as seen from above, of a load point featuring a load monitoring unit (LMU) within a loading facility, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, shipping companies seek to accurately and efficiently detail the load status of each container for which they are responsible. Many companies incorporate imaging systems to provide this analysis (e.g., trailer monitoring units (TMUs)). However, these traditional imaging systems suffer from a number of drawbacks, such as being unable to effectively localize containers within the system's field of view (FOV).

Consequently, the methods/systems of the present disclosure provide solutions to the localization problems associated with the traditional imaging systems. Namely, a method of the present disclosure includes capturing a set of image data featuring the ULD. The method then includes cropping the set of image data to generate a cropped image, such that the cropped image features a portion of the ULD. The method further includes determining one or more candidate edges of the portion of the ULD within the cropped image, and identifying one or more edges of the portion of the ULD from the one or more candidate edges. Each of the one or more edges may represent a boundary of the portion of the ULD.

As used herein, the term "container" shall refer to any container transportable by at least one of a vehicle, a train, a marine vessel, and airplane, and configured to store transportable goods such as boxed and/or unboxed items and/or other types of freight. Accordingly, an example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above.

FIG. 1 is a perspective view, as seen from above, of a load point 101 within a loading facility that depicts a load monitoring unit (LMU) 202 having a 3D camera (e.g., a 3D-depth camera) oriented in a direction to capture 3D image data of a shipping container, in accordance with example embodiments herein. As depicted, shipping container 102 has a shipping container type of "AMJ." Generally, a shipping container is selected from one of several differently dimensioned containers. In various embodiments, shipping containers may comprise any type of unit load device (ULD). For example, a shipping container type may be of any ULD type, including, for example, any of an AMJ type, an AAD type, an AKE type, an AYY type, a SAA type, and APE type, or an AQF type. For ULD shipping containers, the first letter (e.g., "A" for "Certified aircraft container") indicates a specific type of ULD container, such as certified, thermal, etc., the second letter represents base size in terms of dimensions (e.g., "M" for 96×125 inch), and the third letter represents a side contour size and shape (e.g., "J" for a cube shaped ULD container having a diagonal sloping roof portion on one side only). More generally, however, a shipping container may be any aircraft-based shipping container.

The load point 101 may be a predefined search space determined based on the shipping container size, dimensions, or otherwise configuration and/or the area in which the shipping area is localized. For example, in one embodiment, the predefined search space may be determined based on ULD type, shape, or position within a general area. As shown in FIG. 1, for example, the predefined search space is determined based on the size and dimensions of the shipping container 102 which is of type AMJ. In general, load point 101 is defined so as to completely (or at least partially) include or image the shipping container. The load point 101 may further include a frontal area 103 that generally defines a front position of the predefined search space and/or shipping container 102.

FIG. 1 additionally depicts, within load point 101, personnel or loaders 105 and 106 that load packages 104 and 107 into the shipping container 102. In the embodiment of FIG. 1, shipping container 102 is being loaded by loaders 105 with packages 104 and 107 during a loading session. The loading session includes loading a set or group of identified packages into shipping container 102. The loaders 105 and 106 and packages 104 and 107, by movement through the load point 101, may generally cause occlusion and interference with the LMU 202 (as discussed for FIG. 2) capturing 3D image data, over time, of shipping container 102. Thus, accurately localizing the container 102 within the load point 101 is critical to ensure that improper localization does not further complicate the imaging difficulties posed by occlusion and interference during normal operations of a loading session.

Figure 2:
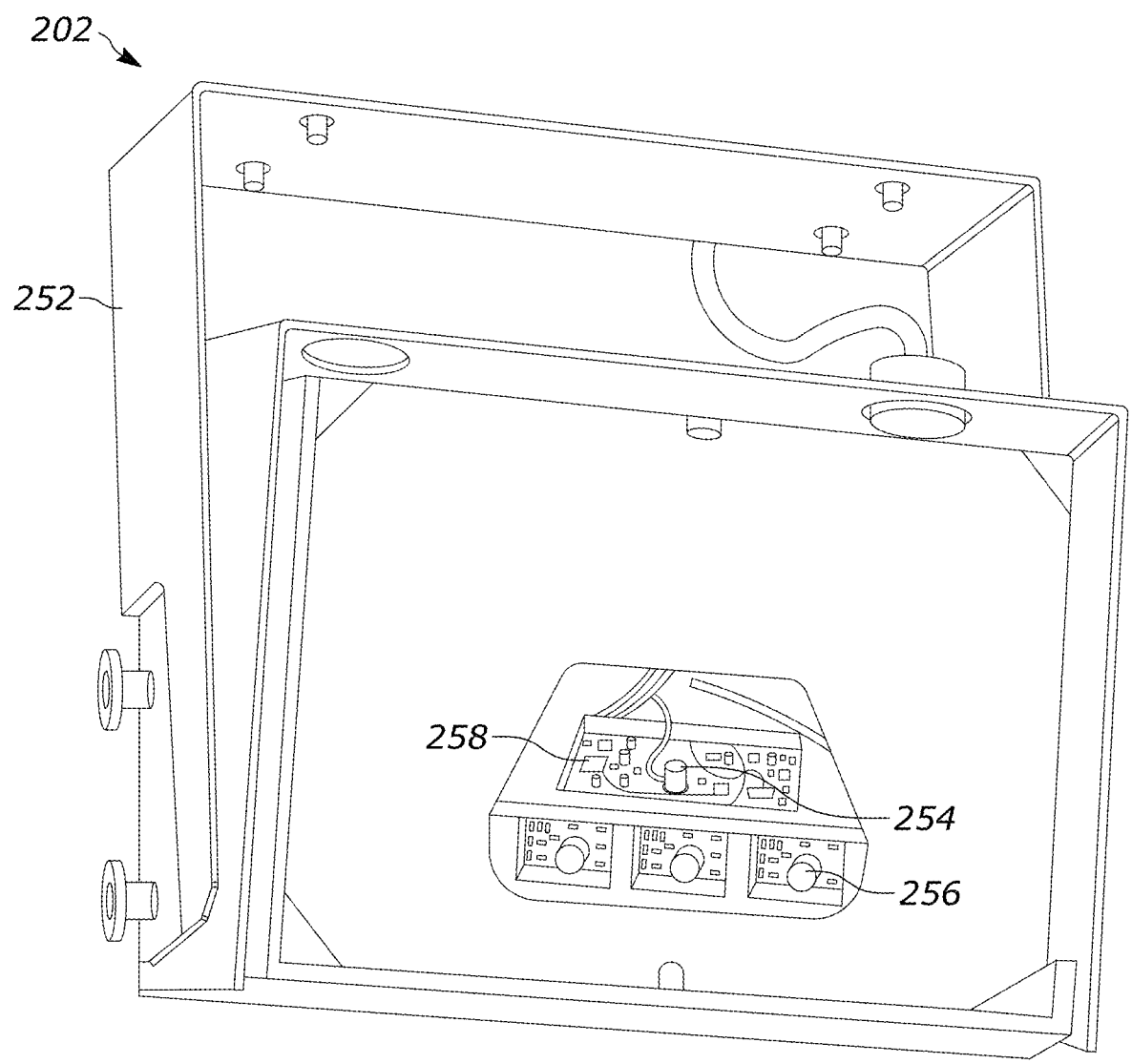
FIG. 2 is a perspective view of the LMU of FIG. 1, in accordance with embodiments described herein.

FIG. 2 is a perspective view of the LMU 202 of FIG. 1, in accordance with example embodiments herein. In various embodiments, LMU 202 is a mountable device. Generally, an LMU 202 comprises camera(s) and a processing board and is configured to capture data of a loading scene (e.g., a scene including space 101). LMU 202 may run container fullness estimation and other advanced analytical algorithms.

LMU 202 may include a mounting bracket 252 for orienting or otherwise positioning the LMU 202 within a loading facility associated with the load point 101, as described herein. The LMU 202 may further include one or more processors and one or more memories for processing image data as described herein. For example, the LMU 202 may include flash memory used for determining, storing, or otherwise processing the imaging data/datasets and/or post-scanning data. In addition, LMU 202 may further include a network interface to enable communication with other devices.

LMU 202 may include a 3D camera 254 (also referenced herein as a "Time-of-Flight (To F) camera") for capturing, sensing, or scanning 3D image data/datasets. For example, in some embodiments, the 3D camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., load point 101) or objects within the predefined search area, such as boxes or packages (e.g., packages 104 and 107) and storage container 102. The IR light or beams may be distributed on the object or surface in a pattern of dots or points by the IR projector, which may be sensed or scanned by the IR camera. A depth-detection app, such as a depth-detection app executing on the one or more processors or memories of LMU 202, can determine, based on the pattern of dots or points, various depth values, for example, depth values of the predefined search area. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or LMU 202 to generate a depth map. The depth map may represent a 3D image of, or contain 3D image data of, the objects or surfaces that were sensed or scanned by the 3D camera 254, for example, the load point 101 and any objects, areas, or surfaces therein. The 3D camera 254 may also be configured to capture other sets of image data in addition to the 3D image data, such as grayscale image data.

LMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D camera 254 such that the LMU 202 can have both sets of 3D image data and 2D image data available for a particular surface, object, area, or scene at the same or similar instance in time. In embodiments, the 3D camera 254 and the photo-realistic camera 256 may be a single imaging apparatus configured to capture 3D depth image data simultaneously with 2D image data. Consequently, the captured 2D images and the corresponding 2D image data may be depth-aligned with the 3D images and 3D image data.

LMU 202 may also include a processing board 258 configured to, for example, perform container fullness estimation and other advanced analytical algorithms based on images captured by the cameras 254, 256. Generally, the processing board 258 may include one or more processors and one or more computer memories for storing image data, and/or for executing apps that perform analytics or other functions as described herein. The processing board 258 may also include transceivers and/or other components configured to communicate with external devices/servers. The processing board 258 may thus transmit and/or receive data or other signals to/from external devices/servers before, during, and/or after performing the analytical algorithms described herein.

In various embodiments, and as shown in FIG. 1, the LMU 202 may be mounted within a loading facility and oriented in the direction of space 101 to capture 3D and/or 2D image data of shipping container 102. For example, as shown in FIG. 1, LMU 202 may be oriented such that the 3D and 2D cameras of LMU 202 may capture 3D image data of shipping container 102, e.g., where LMU 202 may scan or sense the walls, floor, ceiling, packages, or other objects or surfaces within the space 101 to determine the 3D and 2D image data. The image data may be processed by the processing board 258 of the LMU 202 (or, in some embodiments, one or more remote processors and/or memories of a server) to implement analysis, functions, such as graphical or imaging analytics, as described by the one or more various flowcharts, block diagrams, methods, functions, or various embodiments herein. It should be noted that LMU 202 may capture 3D and/or 2D image data/datasets of a variety of loading facilities or other areas, such that additional loading facilities or areas (e.g., warehouses, etc.) in addition to the predefined search spaces (e.g., load point 101) are contemplated herein.

In some embodiments, for example, LMU 202 may process the 3D and 2D image data/datasets, as scanned or sensed from the 3D camera and photo-realistic camera, for use by other devices (e.g., an external server). For example, the processing board 258 of LMU 202 may process the image data or datasets captured, scanned, or sensed from load point 101. The processing of the image data may generate post-scanning data that may include metadata, simplified data, normalized data, result data, status data, or alert data as determined from the original scanned or sensed image data. In some embodiments, the image data and/or the post-scanning data may be sent to a client device/client application, such as a container feature assessment app that may be, for example, installed and executing on a client device, for viewing, manipulation, or otherwise interaction. In other embodiments, the image data and/or the post-scanning data may be sent to a server for storage or for further manipulation. For example, the image data and/or the post-scanning data may be sent to a server. In such embodiments, the server or servers may generate post-scanning data that may include metadata, simplified data, normalized data, result data, status data, or alert data as determined from the original scanned or sensed image data provided by LMU 202. As described herein, the server or other centralized processing unit and/or storage may store such data, and may also send the image data and/or the post-scanning data to a dashboard app, or other app, implemented on a client device, such as the container feature assessment app implemented on a client device.

Figure 3:
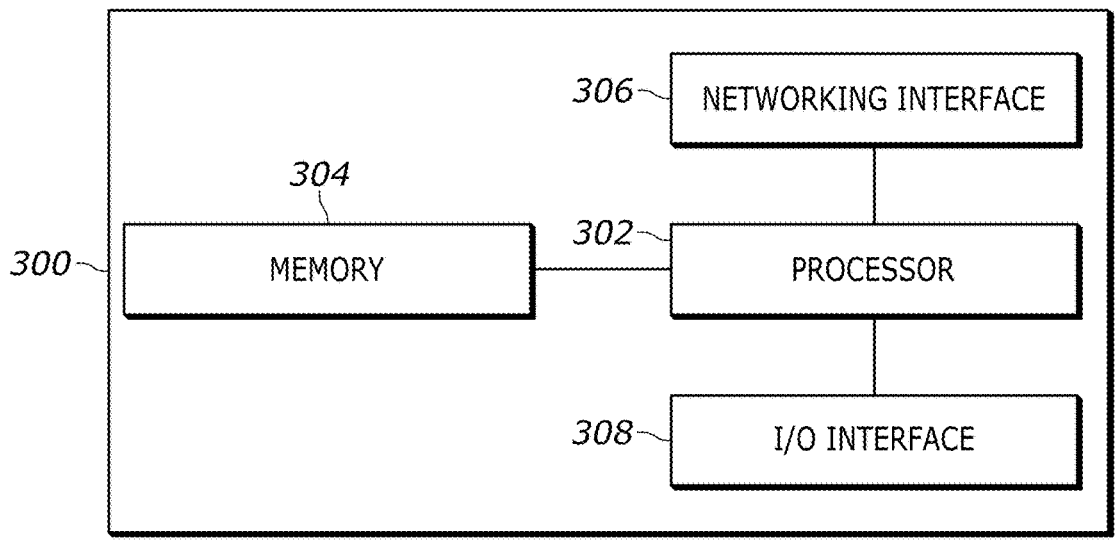
FIG. 3 is a block diagram of an example logic circuit for implementing example methods and/or operations described herein.

FIG. 3 is a block diagram representative of an example logic circuit capable of implementing, for example, one or more components of the example TMU of FIG. 2 or, more generally, the example processing board 258 of FIG. 2. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 306 to enable communication with other machines via, for example, one or more networks. The example network interface 306 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 300 of FIG. 3 also includes input/output (I/O) interfaces 308 to enable receipt of user input and communication of output data to the user. Such user input and communication may include, for example, any number of keyboards, mice, USB drives, optical drives, screens, touchscreens, etc.

Figure 4:
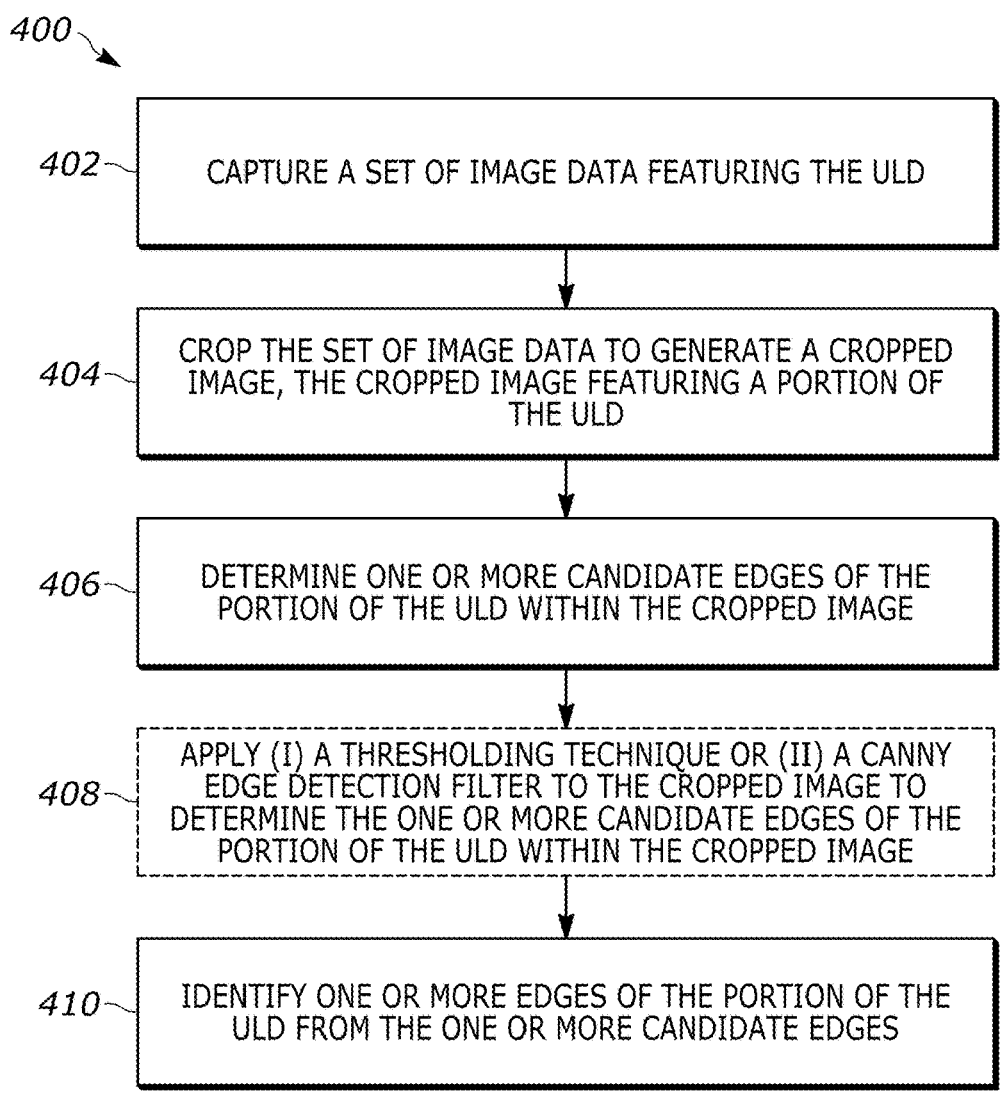
FIG. 4 is a flowchart representative of a method for localizing a ULD, in accordance with embodiments described herein.

FIG. 4 is a flowchart representative of a method 400 for localizing a ULD, in accordance with embodiments described herein. Method 400 describes various methods for localizing a ULD, and embodiments of the method 400 are discussed below in context with FIGS. 5 and 6. Generally speaking, and as mentioned above, the method 400 for localizing a ULD utilizes an expected location of a ULD within a load point (e.g., load point 101) to determine a current location of the ULD within the load point. The expected location of the ULD within the load point may include a depth value as well as Cartesian coordinates representing a vertical and lateral location of the ULD within the image representing the load point. It is to be appreciated that any suitable coordinate system or other measurement metric may be used to represent the expected location of the ULD within the image representing the load point. Block 402 may be performed by, for example, the ToF camera 254 of FIG. 2.

The method 400 begins at block 402 by capturing a set of image data featuring the ULD. Broadly, the set of image data may represent the load point, such that the set of image data may feature the ULD when the ULD is located within the load point (e.g., during a loading session). For example, the LMU 202 of FIG. 2 may automatically capture or receive a signal from an operator instructing the LMU 202 to capture a set of image data in response to the presence of a ULD in the load point (e.g., load point 101). The LMU 202 may capture image data of the ULD using any number of cameras included in the LMU 202, such as the ToF camera 254 and/or the photo-realistic camera 256.

Figure 5:
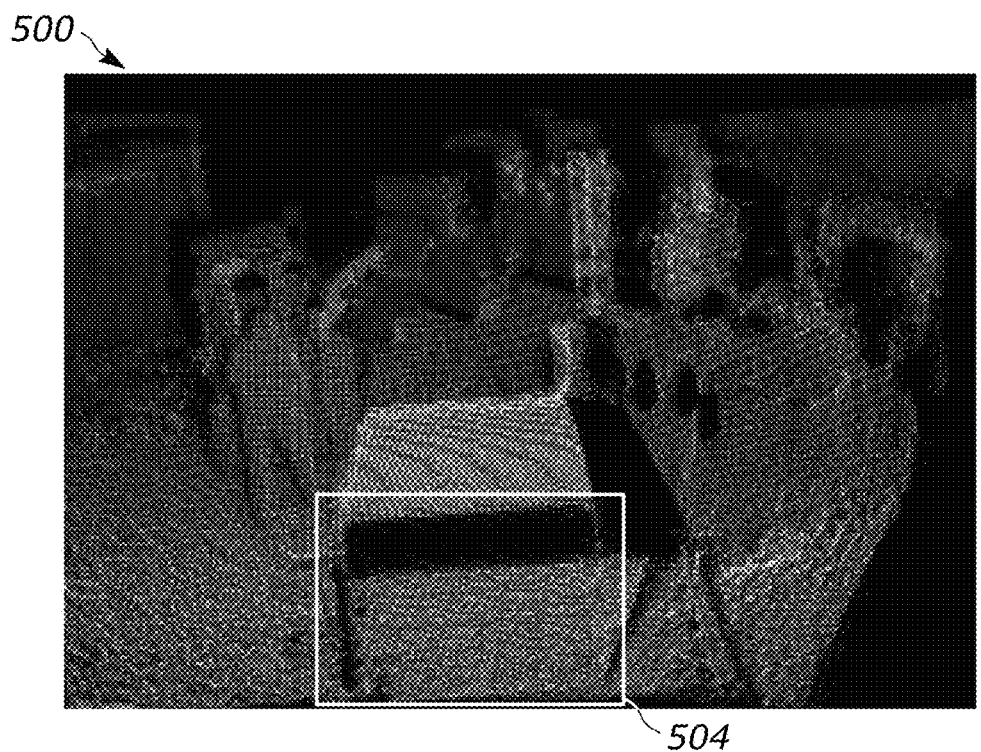
FIG. 5 illustrates a 3-D depth image and a grayscale image of the load point of the loading facility of FIG. 1 captured to facilitate example methods and/or operations described herein.
Figure 5:

In embodiments, and in reference to FIG. 5, the set of image data featuring the ULD includes (i) a three-dimensional depth image 500 and (ii) a grayscale image 502 that is depth-aligned with the three-dimensional depth image 500. The LMU 202 may capture both images using, for example, the ToF camera 254. In this manner, the grayscale image 502 will automatically be aligned with the three-dimensional depth image 500 because both images were captured by the ToF camera 254. However, it is to be understood that the LMU 202 may capture the three-dimensional depth image 500 using the ToF camera 254, and the grayscale image 502, for example, using the photo-realistic camera 256 or any other combination of cameras.

As previously mentioned, the ToF camera 254 may utilize IR projection to calculate depth values corresponding to the IR signals received back at the ToF camera 254. The projected IR beams/pulses may interact with the curved, metal surfaces of many common ULDs in such a manner as to generate distorted and/or otherwise obscured depth values. As illustrated, the three-dimensional depth image 500 features an obscured ULD front portion 504. The obscured ULD front portion 504 is obscured by depth values that do not accurately correspond to the location of the ULD within the load point. Thus, the LMU 202 (and more specifically, the processing board 258) may not successfully identify the obscured ULD front portion 504 as a portion of the ULD because the depth values included in the obscured ULD front portion 504 may not correspond to the expected location of the ULD within the three-dimensional depth image 500.

Unlike the three-dimensional depth image 500, the grayscale image 502 may be, for example, an ambient image or amplitude image captured by the ToF camera 254. Consequently, the grayscale image 502 may represent an amplitude of the signals captured by the ToF camera 254 in other images (e.g., the three-dimensional depth image 500). The grayscale image 502 may thus represent a more accurate representation of the load point because the data comprising the grayscale image 502 remains relatively unaffected by the signal distortion associated with the curved, metal surfaces of many ULDs. As illustrated, the grayscale image 502 features an unobscured ULD front portion 506. The unobscured ULD front portion 506 may clearly indicate the top, bottom, and sides of the featured ULD.

In embodiments, the set of image data featuring the ULD includes (i) a three-dimensional depth image and (ii) a red-green-blue (RGB) image. The LMU 202 may capture the three-dimensional depth image using the ToF camera 254, and may capture the RGB image using, for example, the photo-realistic camera 256. In practice, the ToF camera 254 and the photo-realistic camera 256 may be positioned at different locations within the LMU 202, such that the resulting images (three-dimensional depth image and RGB image, respectively) may need to be aligned. The LMU 202 may align the images such that each pixel representing an object included in the RGB image corresponds to a depth value from a pixel representing the object in the three-dimensional image.

At block 404, the method 400 continues by cropping the set of image data to generate a cropped image. More specifically, the method 400 continues by cropping the grayscale image 502, such that the cropped image features the unobscured ULD front portion 506. In this manner, the LMU 202 may more efficiently and accurately localize the ULD because the unobscured ULD front portion 506 featured in the grayscale image 502 does not suffer from the obscuration and other potential defects associated with the obscured ULD front portion 504 of the three-dimensional depth image 500, described herein.

Figure 6:
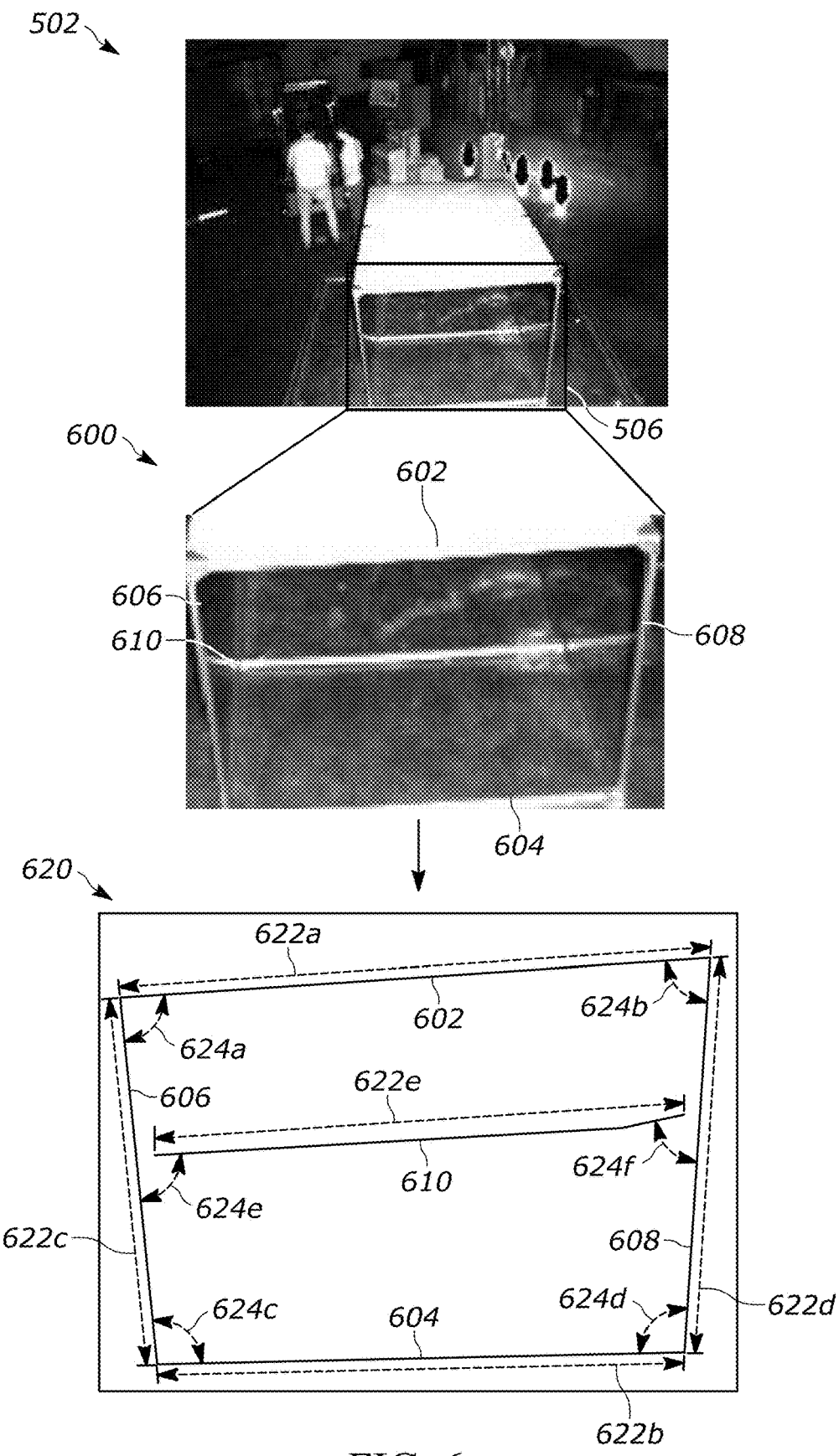
FIG. 6 illustrates a cropped image of the grayscale image of FIG. 5 used to facilitate example methods and/or operations described herein.

The LMU 202 may generally crop the set of image data by performing a series of image crops based on the expected location of the ULD. For example, and as illustrated in FIG. 6, the LMU 202 may crop the unobscured ULD front portion 506 of the grayscale image 502, such that the cropped image 600 may include a top ULD portion 602, a bottom ULD portion 604, a left side ULD portion 606, and a right side ULD portion 608. Block 404 may be performed by, for example, the processing platform 300 of FIG. 3.

In embodiments, the LMU 202 may crop the set of image data based on an expected location of the ULD, including (i) an expected height of the ULD and/or (ii) an expected width of the ULD. The LMU 202 may receive an expected location of the ULD prior to capturing image data (e.g., block 402), for example, via a networking interface (e.g., networking interface 306) based on an input received from an operator or an expected location value retrieved from an external device (e.g., external server). Additionally or alternatively, the LMU 202 may generate or otherwise receive the expected location of the ULD in accordance with a calibration technique, described further herein. As previously mentioned, the expected location of the ULD may indicate coordinates related to the FOV of the LMU 202 cameras within which the ULD should be located.

For example, assume that the grayscale image 502 represents the FOV of the LMU 202 cameras, and further assume that the grayscale image 502 may be overlaid with a coordinate mapping (e.g., a Cartesian coordinate mapping). The coordinate mapping may include a series of 100 equally spaced divisions in a lateral and a vertical direction that divide the grayscale image 502 into a set of 10,000 equal area regions. Moreover, each of the 100 equally spaced divisions may include a numerical identifier, and the numerical identifiers may monotonically increase as the divisions extend further away in the respective directions. Thus, the coordinate mapping may designate the bottom left corner of the grayscale image 502 as the origin (e.g., coordinates (0,0)), the top left corner of the grayscale image 502 having coordinates (0, 100), the bottom right corner of the grayscale image 502 having coordinates (100,0), and the top right corner of the grayscale image 502 having coordinates (100, 100).

Accordingly, the LMU 202 may receive an expected location of the ULD indicating that the ULD should be located within a lateral range of (40, --) to (80, --) and a vertical range of (--, 0) to (--, 40). Combining these ranges, the LMU 202 may determine an expected ULD location area defined by a box having corners at coordinates (40, 0), (40, 40), (80, 0), and (80, 40). As illustrated in FIG. 6, this box may enclose the area featuring the portion of the ULD (e.g., the unobscured ULD front portion 506). However, it should be understood that the expected ULD location area may include objects other than a portion of the ULD.

Further in this example, assume that the three-dimensional image 500 also represents the FOV of the LMU 202 cameras, and that the three-dimensional image 500 may also be overlaid with the coordinate mapping, as described with respect to the grayscale image 502. The three-dimensional image 500 may also include a depth component, such that the coordinates describing any particular point (e.g., pixel) in the three-dimensional image 500 may have a lateral component, a vertical component, and a depth component. The depth component for each pixel included in the three-dimensional image 500 may describe, for example, a distance of an object represented by the pixel from the LMU 202. The depth component corresponding to a pixel may be represented in feet, inches, meters, and/or any other suitable units, or combinations thereof.

Thus, the coordinate mapping of any particular pixel in the three-dimensional image 500 may be represented as (x, y, z), where x is the lateral component, y is the vertical component, and z is the depth component. Accordingly, the expected location of the ULD received by the LMU 202 may indicate that the ULD should be located within a lateral range of (40, --, --) to (80, --, --), a vertical range of (--, 0, --) to (--, 40, --), and a depth range of (--, --, 6) to (--, --, 15). Combining these ranges, the LMU 202 may determine an expected ULD location area defined by a box having corners at coordinates (40, 0, 6-15), (40, 40, 6-15), (80, 0, 6-15), and (80, 40, 6-15), where "6-15" indicates that some or all of the corners may be located at any depth value between 6 and 15.

In any event, it is to be understood that a particular pixel within the three-dimensional image 500 with a coordinate mapping represented as (x, y, z), where x and y represent any suitable coordinate values (as described above) and z represents a depth value, may have a corresponding coordinate mapping (x, y) within the grayscale image 502. When the coordinate mappings for each pixel in the three-dimensional image 500 and the grayscale image 502 are aligned in this manner, the images are considered "depth-aligned." Accordingly, when the LMU 202 identifies a particular pixel within the three-dimensional image 500 to perform cropping and/or any other suitable analysis with respect to the particular pixel, the LMU 202 may perform a similar or identical analysis with respect to the particular pixel within the grayscale image 502. Hence, ensuring that the three-dimensional image 500 and the grayscale image 502 (or in embodiments, the RGB image or other suitable image) are depth-aligned is critical to accurately perform a depth-based cropping and/or any other suitable analysis between the three-dimensional image 500 and any other suitable two-dimensional image.

In embodiments, the LMU 202 may perform (i) a height-based cropping, (ii) a width-based cropping, and/or (iii) a depth-based cropping to crop the set of image data to generate the cropped image 600. As previously discussed, the LMU 202 may crop the grayscale image 502 based on a coordinate overlay that translates to width and height measurements within the environment of the LMU 202 camera FOV (e.g., load point 101). However, the LMU 202 may also crop the grayscale image 502 based on the depth measurements captured in, for example, the three-dimensional image 500. The LMU 202 may receive a depth threshold indicating that any pixels including a depth value that exceeds the depth threshold should be excluded from the cropped image 600. The LMU 202 (and more specifically, the processing board 258) may then scan each pixel included in the three-dimensional image 500, evaluate the depth value for each pixel, and exclude each pixel in the grayscale image 502 that has a depth value in the associated pixel in the three-dimensional image 500 that exceeds the depth threshold. For example, the depth threshold may be 20 meters, such that any pixel in the three-dimensional image 500 including a depth component that is greater than 20 (e.g., any pixel with a coordinate mapping (--, --, z>20)) may be cropped out of the grayscale image 502 when the LMU 202 generates the cropped image 600.

Moreover, the LMU 202 may crop the grayscale image 502 based on the lateral and vertical components of pixels included in the three-dimensional image 500. The LMU 202 may compare the coordinate mappings for each pixel to threshold values (e.g., threshold depth value) and expected location values (e.g., expected location of the ULD). The LMU 202 may determine that a particular pixel in the three-dimensional image 500 includes a depth coordinate that does not exceed the depth threshold, but that the lateral and vertical components are outside the expected location of the ULD. For example, the depth threshold may be 20 and the expected location of the ULD includes pixels enclosed by the surface created by joining the pixels located at (40, 0, 6-20), (40, 40, 6-20), (80, 0, 6-20), and (80, 40, 6-20) within the three-dimensional image 500. The particular pixel may have a depth component of 8, such that the depth component does not exceed the depth threshold of 20. However, in this example, the particular pixel may have a coordinate mapping of (20, 93, 8), such that the particular pixel falls outside the expected location of the ULD. Thus, the particular pixel may be cropped from the grayscale image 502 and may not appear in the cropped image 600. It is to be understood that the cropping techniques described herein may be performed independently or jointly, and in any suitable order to generate the cropped image.

The cropped image 600 may also include a reflection signal 610. The reflection signal 610 may indicate that the amplitude of the returning signal to the LMU 202 is high in the corresponding area of the cropped image 600. This may be the result of a ledge within the ULD and/or other abnormalities within the ULD causing the signals emitted from the LMU 202 to concentrate from the corresponding area when returning to the LMU 202. In any event, the reflection signal 610 may represent a portion of the ULD that is not an edge of an external portion of the ULD (e.g., a front, back, top, bottom, or side of the exterior of the ULD).

At block 406, the method 400 continues by determining one or more candidate edges of the portion of the ULD within the cropped image 600. The LMU 202 may generally determine one or more candidate edges of the portion of the ULD by, for example, analyzing the amplitudes of each pixel included in the cropped image 600. The LMU 202 may receive an amplitude threshold, such that each pixel in the cropped image 600 with an amplitude above the amplitude threshold is included in the one or more candidate edges of the portion of the ULD. Block 406 may be performed by, for example, the processing platform 300 of FIG. 3.

In embodiments, and at optional block 408, the LMU 202 may apply (i) a thresholding technique and/or (ii) a canny edge detection filter to the cropped image 600 to determine the one or more candidate edges of the portion of the ULD within the cropped image 600. Using the thresholding technique, the LMU 202 may darken the background portions of the cropped image 600 while simultaneously lightening the edges of the portion of the ULD. Optional block 408 may be performed by, for example, the processing platform 300 of FIG. 3.

For example, assume the amplitude values for each pixel represented in the grayscale image 502 range from 0-255 (e.g., amplitude values range from 0-255), where 0 represents the darkest possible pixel (minimum amplitude) and 255 represents the brightest possible pixel (maximum amplitude). The LMU 202 may receive a threshold value of 123, indicating that any pixel in the grayscale image 502 with an amplitude value above 123 may be set to 255 and designated as a candidate edge. Similarly, any pixel in the grayscale image 502 with a value below 123 may be set to 0 and designated as a portion of the background of the grayscale image 502. With the grayscale image 502 modified by the threshold technique, the LMU 202 may then identify the one or more candidate edges based on the contours of the image represented by the lightened portions (e.g., pixels with amplitude values set to 255).

As another example, the LMU 202 may apply a canny edge detection filter to the cropped image 600 to determine the one or more candidate edges of the portion of the ULD within the cropped image 600. The LMU 202 may include the canny edge detection filter in memory (e.g., memory 304), or may download and/or otherwise receive the canny edge detection filter from an external source (e.g., via networking interface 306).

Generally speaking, the edge detection performed at block 408 to identify the one or more candidate edges may be sufficient to accurately identify the boundaries of the portion of the ULD. However, occasionally the LMU 202 may characterize a feature of the cropped image 600 as a candidate edge (e.g., reflection signal 610), when the feature does not, in fact, represent an edge of the portion of the ULD. Hence, at block 410, the method 400 continues by identifying one or more edges of the portion of the ULD from the one or more candidate edges. Each of the one or more edges may represent a boundary of the portion of the ULD within the cropped image 600.

Broadly, the LMU 202 may execute instructions to apply various techniques to identify one or more edges, such as the top ULD portion 602, the bottom ULD portion 604, the left side ULD portion 606, and the right side ULD portion 608 of FIG. 6. The techniques applied via the instructions executed by the LMU 202 are designed to avoid the selection of the reflection signal 610 as one of the one or more edges of the portion of the ULD. Block 410 may be performed by, for example, the processing platform 300 of FIG. 3.

In embodiments, the LMU 202 may apply a set of heuristic principles to identify the one or more edges of the portion of the ULD from the one or more candidate edges. The set of heuristic principles may provide a set of checks the LMU 202 can apply to the one or more candidate edges to ensure that certain known quantities related to the ULD are not violated by the one or more candidate edges. The set of heuristic principles may include, for example, (i) a number of boundaries for the portion of the ULD, (ii) an orientation of each boundary of the portion of the ULD, and/or (iii) a perimeter measurement of the boundaries of the portion of the ULD.

For example, the number of boundaries for the portion of the ULD may be set at 4 to represent the top, bottom, and sides of the ULD. Should the LMU 202 identify 5 candidate edges (e.g., 602, 604, 606, 608, 610), the LMU 202 may determine that one or more of these 5 candidate edges must be improperly characterized. Thus, as illustrated in the analytic diagram 620, the LMU 202 may evaluate each of the one or more candidate edges to determine which of the 5 candidate edges are improperly characterized, identify one or more improperly characterized edges (e.g., 610), and remove the one or more improperly characterized edges from the one or more candidate edges. More specifically, the LMU 202 may determine a set of measurements comprising a length 622a-622e and an angle 624a-624f corresponding to each candidate edge 602, 604, 606, 608, 610. The LMU 202 may determine the set of measurements by analyzing the coordinates of each candidate edge 602, 604, 606, 608, 610 within the cropped image 600 (e.g., Cartesian coordinate mappings, as described herein). For example, the LMU 202 may analyze the lateral components, the vertical components, and the depth components of each pixel representing the candidate edges 602, 604, 606, 608, 610, (e.g., as determined from the three-dimensional image 500) to determine the set of measurements for each candidate edge 602, 604, 606, 608, 610.

In the above example, the LMU 202 may analyze the set of measurements for each candidate edge 602, 604, 606, 608, 610 to determine which of the candidate edges may violate the heuristic principle that the number of boundaries for the portion of the ULD cannot exceed 4. As part of this heuristic principle, the LMU 202 may receive (e.g., via networking interface 306), determine (e.g., processor 302), retrieve (e.g., from memory 304), or otherwise access an instruction indicating, for example, that each of the 4 boundaries of the portion of the ULD must be connected to exactly two other boundaries of the portion of the ULD. Thus, the LMU 202 may determine that the reflection signal 610 is improperly characterized as a candidate edge because the reflection signal 610 does not connect to exactly two other boundaries of the portion of the ULD, as indicated by the length 622e of the reflection signal 610.

As another example, the LMU 202 may apply a heuristic principle indicating that a first pair of candidate edges may be substantially parallel to one another, and that a second pair of candidate edges may be substantially perpendicular to the first pair of candidate edges. The LMU 202 may group each respective pair of candidate edges 602, 604, 606, 608, 610 together and compare the angles 624a-624f to threshold values. The LMU 202 may receive (e.g., via networking interface 306), determine (e.g., processor 302), retrieve (e.g., from memory 304), or otherwise access the threshold values. Thus, the LMU 202 may pair candidate edges 602 and 610 together and candidate edges 606 and 608 together to compare the angles 624a, 624b, 624e, and 624f to the threshold values. Similarly, the LMU 202 may pair candidate edges 602 and 604 together and candidate edges 606 and 608 together to compare the angles 624a, 624b, 624c, and 624d to the threshold values. Further, the LMU 202 may pair candidate edges 602 and 604 together and candidate edges 606 and 610 together to compare the angles 624a, 624c, and 624e to the threshold values.

Accordingly, the LMU 202 may proceed to pair each respective candidate edge of the one or more candidate edges 602, 604, 606, 608, 610 with every other respective candidate edge of the one or more candidate edges 602, 604, 606, 608, 610 to compare every possible combination of angles 624a-624f to the threshold values. However, it will be appreciated that the LMU 202 may pair each respective candidate edge of the one or more candidate edges 602, 604, 606, 608, 610 with all, some, or none of the other respective candidate edges 602, 604, 606, 608, 610 when comparing the respective angles 624a-624f to the threshold values, such that not every possible combination of candidate edge pairings need be compared to the threshold values for the LMU 202 to identify improperly characterized candidate edges (e.g., reflection signal 610).

Nonetheless, comparing the angles 624a-624f of various groupings of candidate edges 602, 604, 606, 608, 610 may not result in the LMU 202 identifying which, if any, of the candidate edges 602, 604, 606, 608, 610 is improperly characterized. For example, in the analytic diagram 620, the angles 624e, 624f corresponding to the reflection signal 610 are similar to the angles 624a-624d corresponding to the top ULD portion 602 and the bottom ULD portion 604. The LMU 202 may determine that all of these angles 624a-624f satisfy the threshold values, such that all of the candidate edges 602, 604, 606, 608, 610 remain characterized as candidate edges. Consequently, the LMU 202 may continue to apply heuristic principles until the LMU 202 satisfies the heuristic principle that the number of boundaries for the portion of the ULD cannot exceed 4.

For example, the LMU 202 may apply a heuristic principle indicating that the perimeter measurement of the boundaries of the portion of the ULD must satisfy a perimeter threshold. The perimeter threshold may be based on a coordinate system overlaying the cropped image, as described herein, and the LMU 202 may receive (e.g., via networking interface 306), determine (e.g., processor 302), retrieve (e.g., from memory 304), or otherwise access the perimeter threshold. For example, the perimeter threshold may indicate that, based on the locations of the one or more candidate edges 602, 604, 606, 608, 610 indicated by the coordinates of the associated pixels, the perimeter of the joined edges should equal or exceed the perimeter threshold. Moreover, the joining locations of the one or more candidate edges 602, 604, 606, 608, 610 should be substantially near to the identified ends of each candidate edge 602, 604, 606, 608, 610.

As previously mentioned, the LMU 202 may calculate the length and angle of each candidate edge 602, 604, 606, 608, 610 by retrieving the coordinates corresponding to some or all of the pixels representing each candidate edge 602, 604, 606, 608, 610 from the three-dimensional image 500. The LMU 202 may, for example, retrieve the lateral components, the vertical components, and the depth components corresponding to the end points of each candidate edge 602, 604, 606, 608, 610 from the three-dimensional image 500. The LMU 202 may then calculate a length for each candidate edge 602, 604, 606, 608, 610 by analyzing the lateral, vertical, and depth difference between the endpoints for each candidate edge 602, 604, 606, 608, 610 (e.g., a difference between lateral coordinate values, vertical coordinate values, and depth coordinate values of each endpoint). Similarly, the LMU 202 may calculate angles between each pair of candidate edges 602, 604, 606, 608, 610 utilizing trigonometric associations between lines representing each candidate edge 602, 604, 606, 608, 610. The LMU 202 may identify the lines representing each candidate edge 602, 604, 606, 608, 610 by linearly associating the lateral, vertical, and depth components of the endpoints and/or any combination of points included in each candidate edge 602, 604, 606, 608, 610.

Accordingly, the LMU 202 may analyze the length and positions of each candidate edge 602, 604, 606, 608, 610, including the length 622e and the position of the reflection signal 610. The LMU 202 may determine that the length 622e of the reflection signal 610 is the smallest of each of the candidate edges 602, 604, 606, 608, 610, and that when included in any perimeter calculation, results in a perimeter that does not satisfy the perimeter threshold. Further, when the LMU 202 combines the reflection signal 610 with a substantially parallel candidate edge (e.g., the top ULD portion 602 or the bottom ULD portion 604) and a pair of substantially perpendicular candidate edges (e.g., the left side ULD portion 606 and the right side ULD portion 608), the LMU 202 may determine that the reflection signal 610 includes potential joining locations near the midpoints of the substantially perpendicular candidate edges (e.g., 606, 608).

Thus, when analyzing the 5 candidate edges 602, 604, 606, 608, 610, the LMU 202 may determine that the reflection signal 610 is improperly characterized as a candidate edge. The LMU 202 may then remove the reflection signal 610 from the one or more candidate edges, and continue checking each of the remaining candidate edges (602, 604, 606, 608) until each heuristic principle of the set of heuristic principles is satisfied. Once the LMU 202 checks the one or more candidate edges against the set of heuristic principles and determines that no candidate edge of the one or more candidate edges is improperly characterized, the LMU 202 may designate the one or more candidate edges as one or more edges of the portion of the ULD.

In embodiments, identifying the one or more edges may include training a machine learning model to perform the identification automatically. For example, the processing platform 300 may include a machine learning model in memory 304. The machine learning model may include, for example, a convolutional neural network and/or any other suitable machine learning technique. The processing platform 300 may train the machine learning model using (i) a plurality of cropped images, (ii) one or more candidate edges of the portion of the respective ULD within each cropped image, and/or (iii) one or more edges of the portion of the respective ULD from the one or more candidate edges. Each cropped image may feature a portion of a respective ULD, and each of the one or more edges may represent a boundary of the portion of the respective ULD. Generally, the machine learning model training may take place in two steps. First, the machine learning model may analyze each of the plurality of cropped images in an attempt to determine the known one or more candidate edges. The machine learning model may determine a set of candidate edges that may be compared to the known one or more candidate edges. Based on how closely the set of candidate edges matches the known one or more candidate edges, the model may be adjusted to more accurately identify candidate edges in future iterations.

Second, the machine learning model may analyze the one or more candidate edges in an attempt to determine the known one or more edges. The machine learning model may determine a set of edges that may be compared to the known one or more edges. Based on how closely the set of edges matches the known one or more edges, the model may be adjusted to more accurately identify edges in future iterations.

Similarly, in embodiments, identifying the one or more edges may include applying the machine learning model to the cropped image featuring the portion of the ULD to identify the one or more edges of the portion of the ULD from the one or more candidate edges. In this manner, the processing platform 300 may train and apply the machine learning model to automatically identify edges within cropped images, and may thus increase overall system efficiency by reducing the processing bandwidth necessary to perform the localization.

Generally speaking, while a ULD is located at a load point (e.g., load point 101), the ULD may be loaded, unloaded, or otherwise contacted such that the ULD shifts positions within the FOV of the LMU 202. Consequently, the LMU 202 may localize the ULD, and the ULD may shift position such that the LMU 202 may need to perform the localization again. Thus, and in embodiments, the set of image data may be a first set of image data, and the LMU 202 may capture a second set of image data featuring the ULD. The LMU 202 may capture the second set of image data a duration D after capturing the first set of image data. It should be understood that the duration D may be any suitable duration of time (e.g., seconds, minutes, hours, etc.)

The LMU 202 may then designate the second set of image data as a current set of image data. The LMU 202 may then crop the current set of image data to generate a current cropped image, as described herein. The current cropped image may feature a current portion of the ULD. The current portion of the ULD may be identical to the portion of the ULD featured in the first set of image data, or the current portion of the ULD may include a portion of the ULD that is different from the portion of the ULD featured in the first set of image data. From the current cropped image, the LMU 202 may determine one or more current candidate edges of the current portion of the ULD, as described herein. The one or more current candidate edges may be identical to the one or more candidate edges within the first set of image data, or the one or more current candidate edges may include a candidate edge that is different from the one or more candidate edges within the first set of image data.

The LMU 202 may then identify one or more current edges of the current portion of the ULD from the one or more current candidate edges. Each of the one or more current edges may represent a current boundary of the current portion of the ULD. After identifying the one or more current edges from the current set of image data, the LMU 202 may designate the current set of image data as a prior set of image data, and may capture a subsequent set of image data featuring the ULD the duration D after capturing the prior set of image data. The LMU 202 may then designate the subsequent set of image data as the current set of image data.

Generally, the LMU 202 may iteratively (i) capture subsequent sets of image data, (ii) search the subsequent sets of image data for the ULD, (iii) designate the subsequent sets of image data as current sets of image data, (iv) crop the current sets of image data, (v) determine one or more candidate edges from the current sets of image data, (vi) identify one or more edges from the current sets of image data, and (vii) designate the subsequent sets of image data as prior sets of image data. For example, the LMU 202 may iteratively perform (i)-(vii) until the current set of image data does not feature the ULD (e.g., the result of (ii) indicates that no portion of the ULD is present in the current set of image data).

In embodiments, the LMU 202 may require calibration prior to implementing the localization techniques described above. Generally speaking, calibrating the LMU 202 may include capturing images of a load point including a ULD. Preferably, the ULD may be a large ULD, such that the ULD occupies a substantial portion of the LMU 202 FOV, to reduce the chance of error in the resulting calibration. Once captured, the LMU 202 may analyze the images to determine a location and corresponding dimensions of the featured ULD, in accordance with the various methods described herein. The LMU 202 may then store the determined location and dimensions of the ULD featured in the images in memory (e.g., memory 304), and use them as the expected location and expected dimensions. For example, if the ULD is a large ULD, the LMU 202 may store the determined dimensions of the ULD in memory and utilize the dimensions as a maximum expected width and maximum expected height of a ULD within an image.

The LMU 202 may not possess or otherwise acquire an expected location or dimensions of a ULD prior to calibration. Thus, it is to be understood that the LMU 202 may not crop any obtained image during the calibration process. Instead, the LMU 202 may rely on the edge finding techniques described herein applied directly to the captured images to determine the edges of the featured ULD. Additionally or alternatively, an operator may view the images captured by the LMU 202 and select a region within the captured images to define the location and boundaries of the featured ULD.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for localizing a unit load device (ULD), comprising:
   capturing a set of image data featuring the ULD;
   cropping the set of image data based on an expected location of the ULD within the set of image data to generate a cropped image, the cropped image featuring a portion of the ULD;
   determining one or more candidate edges of the portion of the ULD within the cropped image; and
   identifying one or more edges of the portion of the ULD from the one or more candidate edges, wherein each of the one or more edges represents a boundary of the portion of the ULD.

2. The method of claim 1, wherein the set of image data featuring the ULD comprises (i) a three-dimensional depth image and (ii) a grayscale image that is depth-aligned with the three-dimensional depth image.

3. The method of claim 1, wherein the set of image data featuring the ULD comprises (i) a three-dimensional depth image and (ii) a red-green-blue (RGB) image, and wherein the method further comprises:
   aligning the RGB image with the three-dimensional depth image.

4. The method of claim 1, wherein the expected location includes (i) an expected height of the ULD or (ii) an expected width of the ULD.

5. The method of claim 1, further comprising:
   performing (i) a height-based cropping, (ii) a width-based cropping, or (iii) a depth-based cropping to crop the set of image data to generate the cropped image.

6. The method of claim 1, further comprising:
   applying (i) a thresholding technique or (ii) a canny edge detection filter to the cropped image to determine the one or more candidate edges of the portion of the ULD within the cropped image.

7. The method of claim 1, further comprising:
   applying a set of heuristic principles to identify the one or more edges of the portion of the ULD from the one or more candidate edges, the set of heuristic principles including (i) a number of boundaries for the portion of the ULD, (ii) an orientation of each boundary of the portion of the ULD, or (iii) a perimeter measurement of the boundaries of the portion of the ULD.

8. The method of claim 1, further comprising:
   training a machine learning model using (i) a plurality of cropped images, each cropped image featuring a portion of a respective ULD, (ii) one or more candidate edges of the portion of the respective ULD within each cropped image, and (iii) one or more edges of the portion of the respective ULD from the one or more candidate edges, wherein each of the one or more edges represents a boundary of the portion of the respective ULD; and
   applying the machine learning model to the cropped image featuring the portion of the ULD to identify the one or more edges of the portion of the ULD from the one or more candidate edges.

9. The method of claim 1, wherein the set of image data is a first set of image data, and the method further comprises:
   (a) capturing a second set of image data featuring the ULD a duration D after capturing the first set of image data;
   (b) designating the second set of image data as a current set of image data;
   (c) cropping the current set of image data to generate a current cropped image, the current cropped image featuring a current portion of the ULD;
   (d) determining one or more current candidate edges of the current portion of the ULD within the current cropped image;
   (e) identifying one or more current edges of the current portion of the ULD from the one or more current candidate edges, wherein each of the one or more current edges represents a current boundary of the current portion of the ULD;
   (e) designating the current set of image data as a prior set of image data;
   capturing a subsequent set of image data featuring the ULD the duration D after capturing the prior set of image data;
   (g) designating the subsequent set of image data as the current set of image data; and
   (h) iteratively performing steps (c)-(h) until the current set of image data does not feature the ULD.

10. A system for localizing a unit load device (ULD), comprising:
    a housing;
    an imaging assembly at least partially within the housing and configured to capture a set of image data featuring the ULD;
    one or more processors; and
    a non-transitory computer-readable memory coupled to the imaging assembly and the one or more processors, the memory storing instructions thereon that, when executed by the one or more processors, cause the one or more processors to:
    crop the set of image data based on an expected location of the ULD within the set of image data to generate a cropped image, the cropped image featuring a portion of the ULD;
    determine one or more candidate edges of the portion of the ULD within the cropped image; and
    identify one or more edges of the portion of the ULD from the one or more candidate edges, wherein each of the one or more edges represents a boundary of the portion of the ULD.

11. The system of claim 10, wherein the set of image data featuring the ULD comprises (i) a three-dimensional depth image and (ii) a grayscale image that is depth-aligned with the three-dimensional depth image.

12. The system of claim 10, wherein the set of image data featuring the ULD comprises (i) a three-dimensional depth image and (ii) a red-green-blue (RGB) image, and wherein the instructions further cause the one or more processors to:
    align the RGB image with the three-dimensional depth image.

13. The system of claim 10, wherein
    the expected location includes (i) an expected height of the ULD or (ii) an expected width of the ULD.

14. The system of claim 10, wherein the instructions further cause the one or more processors to:
    perform (i) a height-based cropping, (ii) a width-based cropping, or (iii) a depth-based cropping to crop the set of image data to generate the cropped image.

15. The system of claim 10, wherein the instructions further cause the one or more processors to:
    apply (i) a thresholding technique or (ii) a canny edge detection filter to the cropped image to determine the one or more candidate edges of the portion of the ULD within the cropped image.

16. The system of claim 10, wherein the instructions further cause the one or more processors to:
    apply a set of heuristic principles to identify the one or more edges of the portion of the ULD from the one or more candidate edges, the set of heuristic principles including (i) a number of boundaries for the portion of the ULD, (ii) an orientation of each boundary of the portion of the ULD, or (iii) a perimeter measurement of the boundaries of the portion of the ULD.

17. The system of claim 10, wherein the instructions further cause the one or more processors to:
    train a machine learning model using (i) a plurality of cropped images, each cropped image featuring a portion of a respective ULD, (ii) one or more candidate edges of the portion of the respective ULD within each cropped image, and (iii) one or more edges of the portion of the respective ULD from the one or more candidate edges, wherein each of the one or more edges represents a boundary of the portion of the respective ULD; and apply the machine learning model to the cropped image featuring the portion of the ULD to identify the one or more edges of the portion of the ULD from the one or more candidate edges.

18. The system of claim 10, wherein the set of image data is a first set of image data, and wherein the instructions further cause the one or more processors to:

(a) receive a second set of image data featuring the ULD a duration D after receiving the first set of image data;

(b) designating the second set of image data as a current set of image data;

(c) cropping the current set of image data to generate a current cropped image, the current cropped image featuring a current portion of the ULD;

(d) determining one or more current candidate edges of the current portion of the ULD within the current cropped image;

(e) identifying one or more current edges of the current portion of the ULD from the one or more current candidate edges, wherein each of the one or more current edges represents a current boundary of the current portion of the ULD;

(e) designating the current set of image data as a prior set of image data;

receiving a subsequent set of image data featuring the ULD the duration D after receiving the prior set of image data;

(g) designating the subsequent set of image data as the current set of image data; and (h) iteratively performing steps (c)-(h) until the current set of image data does not feature the ULD.

* * * * *